US007228004B2

(12) United States Patent
Gallagher et al.

(10) Patent No.: US 7,228,004 B2
(45) Date of Patent: Jun. 5, 2007

(54) METHOD FOR SHARPENING A DIGITAL IMAGE

(75) Inventors: Andrew C. Gallagher, Brockport, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 785 days.

(21) Appl. No.: 10/235,130

(22) Filed: Sep. 5, 2002

(65) Prior Publication Data

US 2004/0047514 A1  Mar. 11, 2004

(51) Int. Cl.
*G06K 9/40* (2006.01)
(52) U.S. Cl. ....................... 382/274; 382/263
(58) Field of Classification Search ............ 382/274
See application file for complete search history.

(56) References Cited

U.S. PATENT DOCUMENTS

| 4,001,594 | A | * | 1/1977  | Akimoto et al. ....... 250/559.02 |
| 4,092,067 | A | * | 5/1978  | Grossmann ................... 355/77 |
| 4,101,216 | A | * | 7/1978  | Grossmann ................... 355/35 |
| 4,279,505 | A | * | 7/1981  | Ursprung et al. ............. 355/77 |
| 4,302,672 | A | * | 11/1981 | Kato et al. ................... 250/582 |
| 4,315,318 | A | * | 2/1982  | Kato et al. ................... 382/264 |
| 4,317,179 | A | * | 2/1982  | Kato et al. ................... 382/264 |
| 4,340,911 | A | * | 7/1982  | Kato et al. ................... 382/128 |
| 4,571,635 | A |   | 2/1986  | Mahmoodi et al. |
| 4,650,316 | A | * | 3/1987  | Matsumoto ................... 355/55 |
| 4,666,306 | A | * | 5/1987  | Matsumoto ................... 356/404 |
| 4,707,119 | A | * | 11/1987 | Terashita ...................... 355/38 |
| 4,747,052 | A | * | 5/1988  | Hishinuma et al. ......... 250/587 |
| 4,761,819 | A |   | 8/1988  | Denison et al. |
| 4,792,830 | A | * | 12/1988 | Matsumoto ................... 355/55 |
| 4,792,979 | A | * | 12/1988 | Nomura et al. ............. 382/169 |
| 4,827,526 | A | * | 5/1989  | Matsumoto ................... 382/112 |
| 4,891,829 | A | * | 1/1990  | Deckman et al. ............. 378/4 |
| 4,945,406 | A |   | 7/1990  | Cok |
| 4,977,521 | A | * | 12/1990 | Kaplan ........................ 382/254 |
| 5,049,916 | A | * | 9/1991  | O'Such et al. ............... 396/62 |

(Continued)

FOREIGN PATENT DOCUMENTS

EP    0 398 861 A2    11/1990

(Continued)

OTHER PUBLICATIONS

U.S. Appl. No. 09/981,176, filed Oct. 17, 2001 by Gallagher et al.

(Continued)

*Primary Examiner*—Bhavesh M. Mehta
*Assistant Examiner*—Sath V. Perungavoor
(74) *Attorney, Agent, or Firm*—Thomas H. Close; Robert L. Walker

(57) ABSTRACT

A method of sharpening a digital image having image pixels values includes the steps of: determining a $D_{min}$ value, representing a value corresponding to a minimum possible exposure for a system that produced the digital image; for each pixel value in the digital image providing a gain factor that is dependent on the difference between the pixel value and the $D_{min}$ value, such that pixel values nearer the $D_{min}$ value have smaller gain factors; and using the gain factors to sharpen the digital image.

3 Claims, 8 Drawing Sheets

U.S. PATENT DOCUMENTS

| | | | |
|---|---|---|---|
| 5,051,842 A | 9/1991 | Shimazaki | |
| 5,081,485 A | 1/1992 | Terashita | |
| 5,081,692 A | 1/1992 | Kwon et al. | |
| 5,134,573 A | 7/1992 | Goodwin | |
| 5,200,765 A * | 4/1993 | Tai | 347/240 |
| 5,224,177 A * | 6/1993 | Doi et al. | 382/168 |
| 5,279,927 A * | 1/1994 | Walls et al. | 430/331 |
| 5,311,251 A * | 5/1994 | Roule et al. | 355/77 |
| 5,316,892 A * | 5/1994 | Walls et al. | 430/309 |
| 5,380,635 A * | 1/1995 | Gomez et al. | 430/517 |
| 5,475,493 A * | 12/1995 | Yamana | 356/404 |
| 5,561,494 A * | 10/1996 | Terashita | 355/38 |
| 5,682,443 A | 10/1997 | Gouch et al. | |
| 5,701,560 A * | 12/1997 | Tsujita et al. | 430/97 |
| 5,703,671 A * | 12/1997 | Narita et al. | 355/32 |
| 5,717,469 A * | 2/1998 | Jennes et al. | 348/571 |
| 5,719,661 A * | 2/1998 | Terashita | 355/38 |
| 5,759,754 A * | 6/1998 | Dickerson | 430/502 |
| 5,822,453 A | 10/1998 | Lee et al. | |
| 5,828,441 A * | 10/1998 | Narita et al. | 355/32 |
| 5,828,793 A * | 10/1998 | Mann | 382/284 |
| 5,835,137 A * | 11/1998 | McKeown | 348/208.4 |
| 5,860,648 A * | 1/1999 | Petermeier et al. | 273/108.2 |
| 5,886,353 A * | 3/1999 | Spivey et al. | 250/370.09 |
| 5,905,817 A * | 5/1999 | Matama | 382/260 |
| 5,959,720 A * | 9/1999 | Kwon et al. | 355/38 |
| 5,966,506 A * | 10/1999 | Morton | 358/1.9 |
| 6,005,683 A * | 12/1999 | Son et al. | 358/488 |
| 6,020,909 A * | 2/2000 | Kocher et al. | 347/251 |
| 6,037,109 A * | 3/2000 | Fuessel et al. | 430/359 |
| 6,058,201 A * | 5/2000 | Sikes et al. | 382/112 |
| 6,091,861 A * | 7/2000 | Keyes et al. | 382/299 |
| 6,094,689 A * | 7/2000 | Embry et al. | 710/5 |
| 6,097,470 A | 8/2000 | Buhr et al. | |
| 6,097,471 A | 8/2000 | Buhr et al. | |
| 6,101,273 A * | 8/2000 | Matama | 382/169 |
| 6,167,165 A | 12/2000 | Gallagher et al. | |
| 6,223,585 B1 * | 5/2001 | Krogstad | 73/32 R |
| 6,296,995 B1 * | 10/2001 | Camp et al. | 430/505 |
| 6,384,937 B1 | 5/2002 | Matama | |
| 6,415,049 B1 * | 7/2002 | Yanagita et al. | 382/132 |
| 6,728,003 B1 | 4/2004 | Gallagher et al. | |
| 6,804,408 B1 | 10/2004 | Gallagher et al. | |
| 7,102,673 B2 * | 9/2006 | Kimura | 348/246 |
| 2003/0076514 A1 | 4/2003 | Gallagher et al. | |
| 2003/0112480 A1 * | 6/2003 | Chiu | 358/504 |
| 2003/0206231 A1 | 11/2003 | Chen et al. | |
| 2005/0141002 A1 * | 6/2005 | Takano et al. | 358/1.9 |

FOREIGN PATENT DOCUMENTS

EP        0 851 666 A2    7/1998

OTHER PUBLICATIONS

Curlander, Image Enhancement Using Digital Adaptive Filtering, Master's Thesis, MIT, 1977, pp. 30-34, 48-49; 63; 72-73; 93-94.
Textbook, Anil K. Jain, Fundamentals of Digital Imaging Processing, 1989, By Prentice-Hall, Inc., pp. 249-251.

\* cited by examiner

METHOD FOR SHARPENING A DIGITAL IMAGE

FIELD OF THE INVENTION

The invention relates generally to the field of digital image processing and, more particularly, to a method of image sharpening.

BACKGROUND OF THE INVENTION

In processing a digital image, it is common to sharpen the image and enhance fine detail with sharpening algorithms. Typically, sharpening is performed by a convolution process (for example, see A. K. Jain, *Fundamentals of Digital Image Processing*, Prentice-Hall: 1989, pp. 249–251). The process of unsharp masking is an example of a convolution-based sharpening process. For example, sharpening an image with unsharp masking can be described by the equation:

$$s(x,y)=i(x,y)b(x,y)+\beta f(i(x,y)-i(x,y)b(x,y)) \qquad (0)$$

where:

s(x,y)=output image with enhanced sharpness
i(x,y)=original input image
b(x,y)=lowpass filter
β=unsharp mask gain factor
f( )=fringe function
** denotes two dimensional convolution
(x,y) denotes the $x^{th}$ row and the $y^{th}$ column of an image Typically, an unsharp image is generated by convolution of the image with a lowpass filter (i.e., the unsharp image is given by i(x,y)b(x,y)). Next, the highpass, or fringe data is generated by subtracting the unsharp image from the original image (i.e., the highpass data is found with i(x,y)−i(x,y)b(x,y)). This highpass data is then modified by either a gain factor β or a fringe function f( ) or both. Finally, the modified highpass data is summed with either the original image or the unsharp image to produce a sharpened image.

A similar sharpening effect can be achieved by modification of the image in the frequency domain (for example, the FFT domain) as is well known in the art of digital signal processing.

One problem associated with image sharpening is noise amplification. Noise amplification can be a special problem when sharpening a digital image originating from film. Specifically, image regions originally receiving little or no light exposure (also called $D_{min}$) on the film can appear quite noisy when the image is sharpened.

Curlander (in "Image Enhancement Using Digital Adaptive Filtering," Master's Thesis, Massachusetts Institute of Technology, 1977, p. 30–34, 48–49, 63,72–73, 93–94) describes methods of sharpening a digital image, where the highpass gain factor is determined from the lowpass signal value, the local contrast, or the highpass signal value. Curlander did not describe sharpening of a rendered image in such a way as to minimize the amplification of image $D_{min}$ noise.

For photographic negatives, the areas of the film receiving no exposure have a minimum density called $D_{min}$. $D_{min}$ is also sometimes referred to as mask or base density. Underexposed film images typically have image areas containing $D_{min}$. It is common to use the value of $D_{min}$ in the processing of digital images for the purpose of improving image quality. For example, in U.S. Pat. No. 5,081,485 issued Jan. 14, 1992, Terashita describes a method of using a mask density to improve the exposure estimate for an image. To this end, the mask density is subtracted from the average density. This increases the robustness of the determined color balance by decreasing the variability between different color negative films. However, Terashita's method does not ensure that regions of an image sensing device receiving little or no light exposure are specially handled to reduce the sharpening of noise.

It is occasionally desirable to sharpen different regions or pixels of the image by different amounts. For example, is it has been suggested that it is desirable to sharpen the pixels representing human faces to a lesser degree than pixels representing a building. For example, in U.S. Pat. No. 5,682,443 issued Oct. 28, 1997, Gouch et al. describe the modification of the gain of the unsharp mask based on the color of a pixel (and the color of the surrounding neighborhood). Gouch does not consider the undesirable noise amplification of $D_{min}$ regions that accompanies the image sharpening.

Alternatively, in U.S. Pat. No. 4,571,635 issued Feb. 18, 1986, Mahmoodi et al. teach a method of deriving a gain factor β that is used to scale the high frequency information of the digital image depending on the standard deviation of the image pixels within a neighborhood. In addition, in U.S. Pat. No. 5,081,692 issued Jan. 14, 1992, Kwon et al. teach that a gain factor β is based on a center weighted variance calculation. In U.S. Pat. No. 4,761,819 issued Aug. 2, 1988, Denison et al. describe a method where the gain factor of an unsharp mask is dependent on both a local variance calculation and a noise statistic. While these methods do indeed sharpen the image while attempting to minimize noise amplification, they are computationally complex. In addition, these methods do not explicitly consider the $D_{min}$ region of the image, and therefore some $D_{min}$ noise is amplified.

Shimazaki in U.S. Pat. No. 5,051,842 issued Sep. 24, 1991, describes an apparatus which generates unsharp signals from images, derives two parameters based on either the image signal level or the unsharp signal level from a pre-determined lookup table, multiplies one parameter with the image signal, multiplies the other parameter with the unsharp signal, and adds the two resulting signals to obtain the final image signal. One embodiment requires that the sum of the two parameters equal one for all image signal levels. In this case, the method is mathematically equivalent to the unsharp mask equation. Shimazaki teaches that the two parameters are signal dependent with the signals representing image highlights resulting in the highest degree of sharpening. The two parameters are chosen such that the sharpening decreases as either the image signal or the unsharp signal decreases until the sharpening level is zero. At that point, the sharpening converts to blurring as the image signal or unsharp signal continue to decrease into the shadow region of the density range. Shimazaki's apparatus suffers from not accounting explicitly for the $D_{min}$ density level.

Gallagher et al. in U.S. Pat. No. 6,167,165 issued Dec. 26, 2000, describe a method of selecting a gain for an unsharp mask based on a local intensity level. While this method does demonstrate an unsharp mask gain having dependence on local intensity, is does not describe sharpening in such a manner as to de-emphasize $D_{min}$ noise.

Keyes et al. in U.S. Pat. No. 6,091,861 issued Jul. 18, 2000, and Matama in U.S. Pat. No. 6,384,937 issued May 7, 2002, both describe methods of selecting a constant, position independent gain factor based on the exposure of the image. Lower gain factors will be selected for images that are underexposed, thereby providing less gain for that image than for a normally exposed image. These methods are insufficient to handle scenarios where an image contains both underexposed (or $D_{min}$) regions and normally exposed regions. Since a single gains factor is selected for the entire image, either the underexposed region or the normally exposed region will be sharpened with a sub-optimal gain factor.

Further complicating the problem of $D_{min}$ noise being amplified by sharpening is that it is typical for an imaging system to sharpen a rendered image. Rendering, or mapping input image densities to output media densities on the output media occurs in both digital imaging and optical imaging and is well known to those skilled in the art. U.S. Pat. No. 6,097,470 issued Aug. 1, 2000 to Buhr et al., describes image rendering. It is difficult to determine the areas of a rendered digital image that correspond to the $D_{min}$ of the film. This is because a black portion of a rendered digital image could originate from a $D_{min}$ portion of the film, or it could originate from a normally exposed portion of the film. Thus, it is difficult to avoid amplifying the $D_{min}$ noise when sharpening a rendered image. U.S. patent application Ser. No. 09/981,176, filed Oct. 17, 2001, describes a method of determining the propagated value of $D_{min}$ in a rendered image, but there is no mention of using that propagated $D_{min}$ value to aid in the sharpening of the rendered image. In addition, none of the previously mentioned sharpening methods describes sharpening a rendered image such that the $D_{min}$ noise is not amplified.

Therefore, there exists a need for an improved image sharpening method that adjusts the amount of sharpening while avoiding amplifying $D_{min}$ noise.

SUMMARY OF THE INVENTION

The need is met according to the present invention by providing a method of sharpening a digital image having image pixels values that includes the steps of: determining a $D_{min}$ value, representing a value corresponding to a minimum possible exposure for a system that produced the digital image; for each pixel value in the digital image providing a gain factor that is dependent on the difference between the pixel value and the $D_{min}$ value, such that pixel values nearer the $D_{min}$ value have smaller gain factors; and using the gain factors to sharpen the digital image.

ADVANTAGES

The present invention has the advantage of producing sharper images without amplifying noise associated with the portion of film receiving little or no light exposure (also called $D_{min}$).

DETAILED DESCRIPTION OF THE INVENTION

In the following description, an embodiment of the present invention will be described as a method implemented as a software program. Those skilled in the art will readily recognize that the equivalent of such software may also be constructed in hardware. Because image enhancement algorithms and methods are well known, the present description will be directed in particular to elements forming part of, or cooperating more directly with, the method and system in accordance with the present invention. Other elements, and hardware and/or software for producing and otherwise processing the image signals, not specifically shown or described herein, may be selected from such materials, components and elements known in the art. Given the system and method as shown and described according to the invention in the following materials, software not specifically shown, described or suggested herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A digital image typically includes one or more two-dimensional arrays of numbers. For example, a color digital image may include three arrays representing red, green, and blue pixel values respectively, or a monochrome image may include one array of pixel values corresponding to light intensities. With regard to matters of nomenclature, the value of a pixel of a digital image located at coordinates (x,y), referring to the $x^{th}$ row and the $y^{th}$ column of a digital image, shall herein comprise a triad of values [r(x,y), g(x,y), b(x,y)] respectively referring to the values of the red, green and blue digital image channels at location (x,y). In this regard, a digital image may be considered as comprising a certain number of digital image channels. In the case of a digital image comprising red, green and blue two-dimensional arrays, the image comprises three channels, namely, red, green and blue spectral channels.

In general, the present invention describes a method of sharpening an image where the sharpening amount (applied to any local region of the image) is dependent on the noise characteristics of the source image signal. Specifically, the present invention is useful for digital images from a film source. The present invention ensures that image regions near $D_{min}$ in the source image have reduced sharpening, thereby reducing noise visibility.

Figure 1:
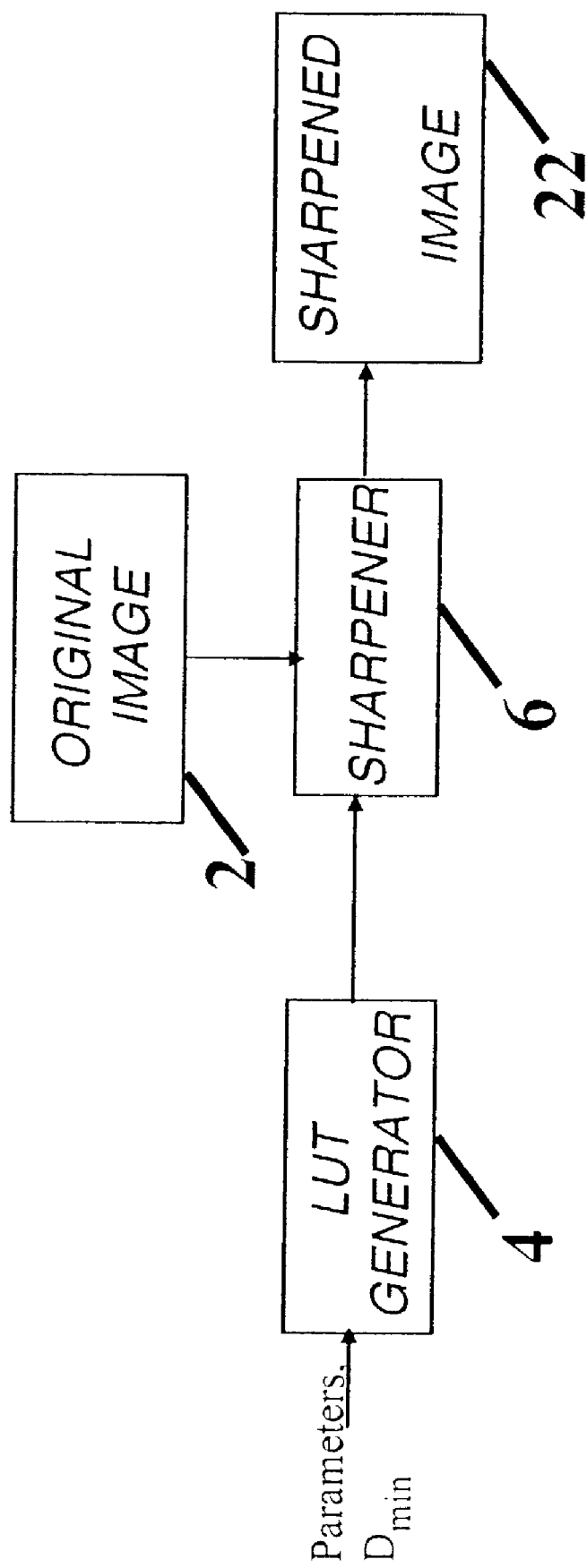
FIG. 1 is a block diagram illustrating a technique for sharpening an original image according to a first embodiment of the invention.

Referring to FIG. 1, parameters are input to the LUT generator 4 for creating a LUT (Look-Up-Table) $\beta_{LUT[]}$ that defines the relationship between the sharpening gain factor $\beta$ and the intensity of the digital image. Those skilled in the art will recognize that the output of the LUT generator 4 could be a mathematical function just as easily as a LUT. The method of creating the LUT will be described hereinbelow.

The LUT generator 4 preferably creates the gain LUT using the following equation (1)

If $(x<X_{min}) \beta_{LUT}[x]=Y_{min}$ (1)

Else If $(x>X_{max}) \beta_{LUT}[x]=Y_{max}$

Else $\beta_{LUT}[x]=Y_{min}+(Y_{max}-Y_{min})(0.5+0.5*\sin((x-X_{min})/(X_{max}-X_{min})\pi-\pi/2)$ Where:

$X_{min}$ is set to the value of $D_{min}$. $D_{min}$ represents a value corresponding to a minimum possible exposure for a system that produced the digital image. $D_{min}$ can be determined by using the system to capture a reference dark scene (for example an exposure in a camera without removing a lens cap) and averaging the digital values derived from the reference dark exposure. The average is taken because pixel values can contain noise, resulting in pixel values slightly above and below the actual $D_{min}$ values. The process of averaging removes the fluctuations due to noise.

$X_{max}$ is a user selectable parameter and represents a pixel value above which the sharpening gain factor is constantly the maximum gain factor $Y_{max}$.

$Y_{min}$ is a user selectable parameter and represents a minimum gain factor (i.e. the gain factor for $D_{min}$ regions of the image.)

$Y_{max}$ is a user selectable parameter and represents a maximum gain factor.

The values of Xmax, Ymin and Ymax are arrived at empirically by processing, printing and viewing prints to determine optimal values for these parameters.

Figure 2:
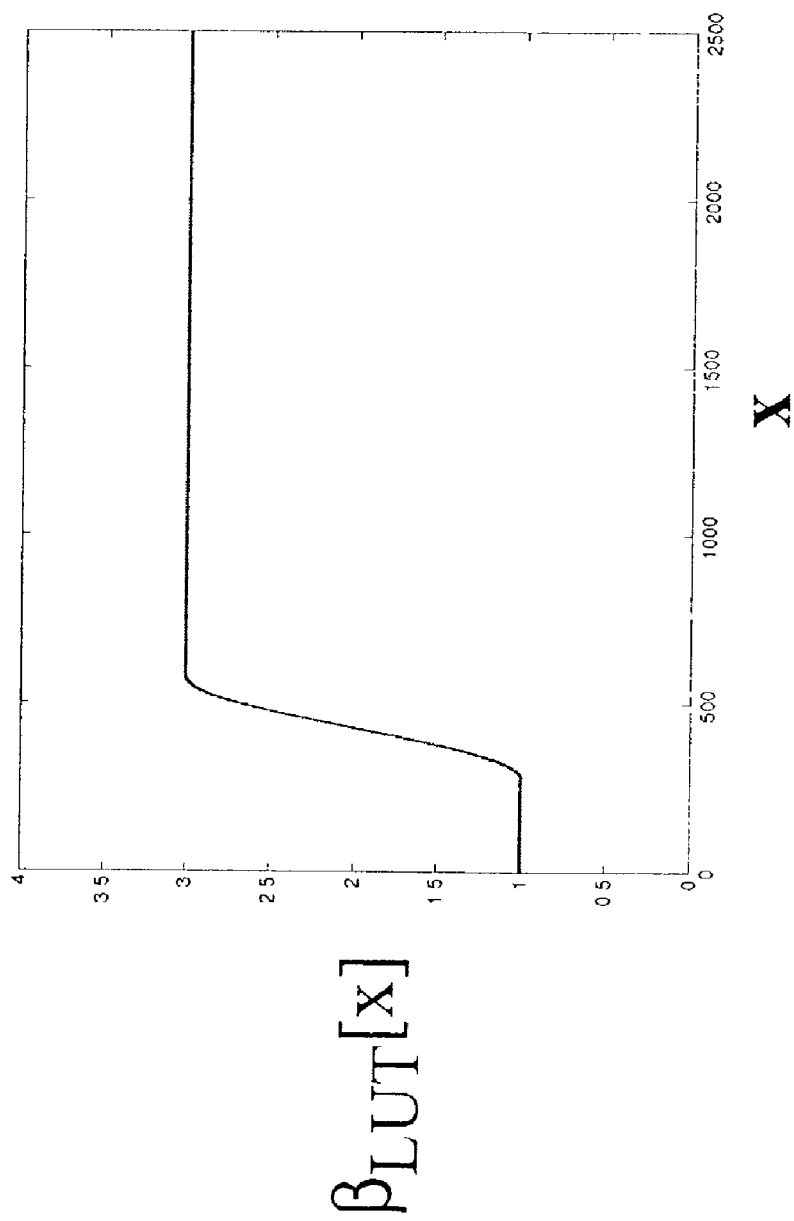
FIG. 2 is a plot of the gain LUT $\beta_{LUT}[x]$.

FIG. 2 shows a plot of $\beta_{LUT}[x]$ using illustrative values of $X_{min}=279$, $X_{max}=579$, $Y_{min}=1.0$, and $Y_{max}=3.0$. Those skilled in the art will recognize that many similar functions can be constructed that will result in lower values of $\beta_{LUT[\ ]}$ in the neighborhood of $D_{min}$ to ensure that $D_{min}$ noise is not overly-amplified, and higher values elsewhere. As shown in FIG. 2, the function represented by $\beta_{LUT[\ ]}$ is a monotonic function of pixel value that increases from the $D_{min}$ value ($X_{min}$) to a predetermined pixel value ($X_{max}$) and is constant for pixel values that exceed the predetermined pixel value.

Referring back to FIG. 1, an original image 2 i(x,y) having $x_o$ rows and $y_o$ columns is input to the image sharpener 6 for sharpening the image according to the gain LUT $\beta_{LUT[\ ]}$ produced by the LUT generator 4. Preferably, the image i(x,y) is of high resolution, for example, an illustrative high resolution image would have $x_o=1024$ rows of pixels by $y_o=1536$ columns of pixels. The original image may be a digitized version of a photographic film image, or a digital image captured by an electronic camera. The sharpener 6 receives the original image 2 and outputs a sharpened image 22. The operation of the image sharpener 6 can be described by the following equation (2).

$s(x,y)=i(x,y)b(x,y)+\beta(x,y)f(i(x,y)-i(x,y)b(x,y))$ (2)

where:
s(x,y)=output image with enhanced sharpness without amplifying $D_{min}$ noise
i(x,y)=original input image
b(x,y)=lowpass filter
β(x,y)=unsharp mask gain factor for location (x,y). Preferably in the first embodiment, the gain factor is found with $\beta(x,y)=\beta_{LUT}[i(x,y)**b(x,y)]$, where $\beta_{LUT}[\ ]$ is a look-up-table of gain factors.
f( )=fringe function
i(x,y)**b(x,y)=lowpass image (also called unsharp image)
i(x,y)−i(x,y)**b(x,y)=highpass image
** denotes two dimensional convolution
(x,y) denotes the $x^{th}$ row and the $y^{th}$ column of an image Preferably, the lowpass filter is a Gaussian lowpass filter. This Gaussian filter is a two-dimensional, circularly symmetric, low-pass filter whose filter coefficients may be derived by the following formula which is well known in the art:

$$b(i,i) = \frac{1}{\sigma\sqrt{2\pi}} \exp\left[\frac{-(i^2+i^2)}{2\sigma^2}\right]$$ (3)

where:
b(i,j)=the Gaussian filter coefficient at the $(i,j)^{th}$ pixel
σ=the standard deviation of the Gaussian filter
π=the constant approximately 3.14159265 . . .

Preferably, the Gaussian filter is a 5 by 5 pixel filter made with σ=
1. The filter coefficients are as follows:
[0.003 0.0133 0.0219 0.0133 0.003
0.0133 0.0596 0.0983 0.0596 0.0133
0.0219 0.0983 0.162 0.0983 0.0219
0.0133 0.0596 0.0983 0.0596 0.0133
0.003 0.0133 0.0219 0.0133 0.003])

The gain factor β(x,y) for each pixel value in the digital image is dependent on the difference between the pixel value and the $D_{min}$ value, such that pixel values nearer the $D_{min}$ value have smaller gain factors. The gain factors are used to sharpen the digital image as follows.

An unsharp image is generated by convolution of the image with a lowpass filter (i.e., the unsharp image is given by i(x,y)b(x,y)). Next, the highpass, or fringe data is generated by subtracting the unsharp image from the original image (i.e., the highpass data is found with i(x,y)−i(x,y)b(x,y)). This highpass data is then modified by the signal dependent gain factor β(x,y) and possibly a fringe function f( ). In the preferred embodiment, the fringe function is identity and can be omitted without effect. The gain factor β(x,y) is dependent on the value of the unsharp original image. Although in the embodiment as described, the gain factor is dependent on the unsharp image, those skilled in the art of image processing will realize that the gain factor β(x,y) could have been dependent on the original image or an unsharp image made with a different lowpass filter with similar effect. Finally, the modified highpass data is summed with the unsharp image to produce a sharpened image. (Those skilled in the art will recognize that this is equivalent with summing the modified highpass data to the original image, with an appropriate modification to the gain factors.)

Each channel of the digital image may be operated upon by the sharpener 6. In this case, it is preferred that the parameters $X_{min}$, and $X_{max}$, used by the LUT generator 4, be adjusted accordingly, as typical consumer films generally have different $D_{min}$ values in each of the color channels (blue channel $D_{min}$ is typically higher than green channel $D_{min}$ which is typically higher than red channel $D_{min}$). Preferably, each color channel is treated in an independent manner.

Alternatively, it may sometimes be desirable for the gain factor to be fixed across color channels at each pixel location (x,y) throughout the image. This can be accomplished by taking the mean, median, minimum or some other combination of the determined gain factors at each pixel location.

As another alternative, a luminance channel is created as is commonly known in the art by making a linear combination of the image's color channels. Then, this single channel is input to the sharpener 6 for creating a sharpened output image. The luminance channel l(x,y) is created by linearly combining all the color channels of the image. For example:

$$l(x, y) = \sum_{n=0}^{n=C-1} a_n c_n(x, y) \quad (4)$$

where:
C is the number of image channels,
$c_n$ is the $n^{th}$ color channel of the image i(x,y)
$\alpha_n$ is the coefficient weighing factor for the $n^{th}$ color channel.
The sum of all the coefficient weighting factors is preferably 1.0.

In the case of an image i(x,y) having red, green, and blue channels, the preferred values for the red, green, and blue coefficient weighting factors are all equally ⅓. Assuming the input image is a color image consisting of red, green, and blue color channels, a matrix is first applied to the image in order to produce a luminance channel and two or more color difference channels. Next the unsharp mask process is applied to the luminance channel via the sharpener 6. Finally, an inverse matrix is applied to the luminance and color difference channels to generate an enhanced color image having red green and blue channels.

Figure 3:
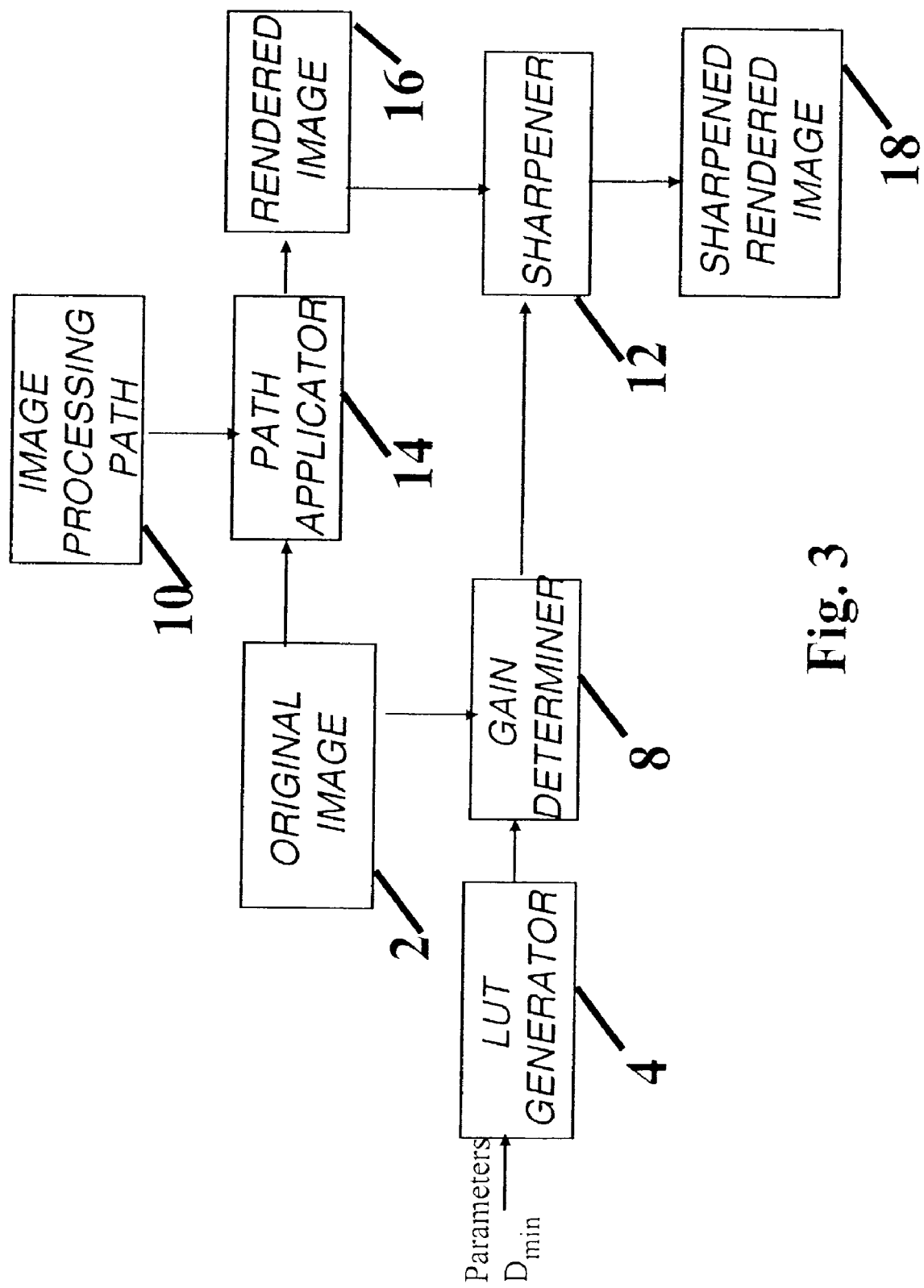
FIG. 3 is a block diagram illustrating a technique for sharpening a rendered image according to a second embodiment of the invention.

A second embodiment of the present invention is shown in FIG. 3. In this embodiment, the original image 2 i(x,y) is input to a path applicator 14, along with an image processing path 10. The path applicator 14 modifies the original image 2 i(x,y) using the image processing path 10, in order to create a rendered image 16 R(x,y). The original image 2, a digitization of film, is not suitable for an output device such as a CRT monitor or a printer. The image processing path applicator 14 applies an image processing path 10 (a series of image transforms) for the purpose of creating a rendered image 16 R(x,y).

Figure 4:
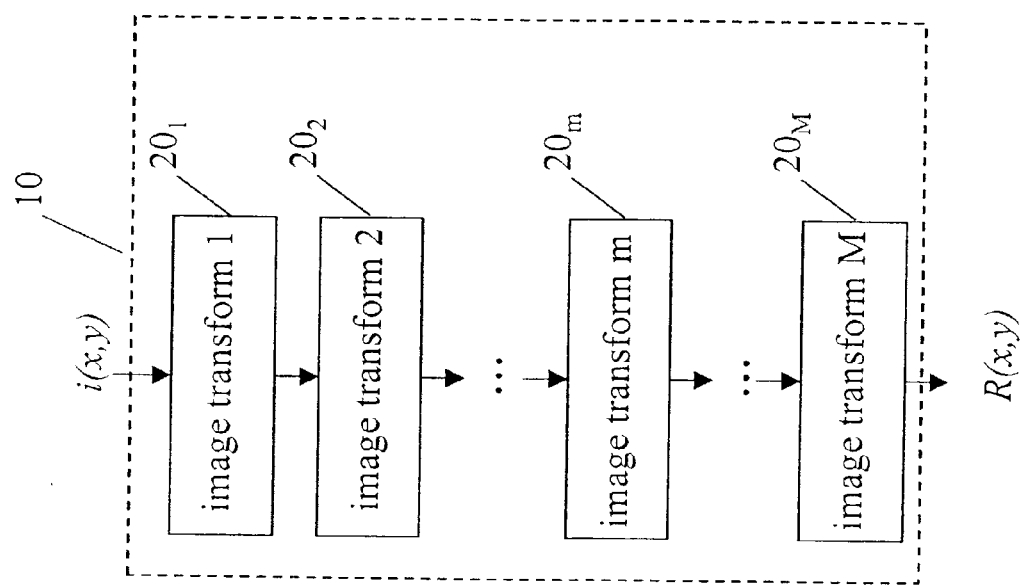
FIG. 4 is a block diagram of an image processing path composed of M image transforms.
Figure 5:
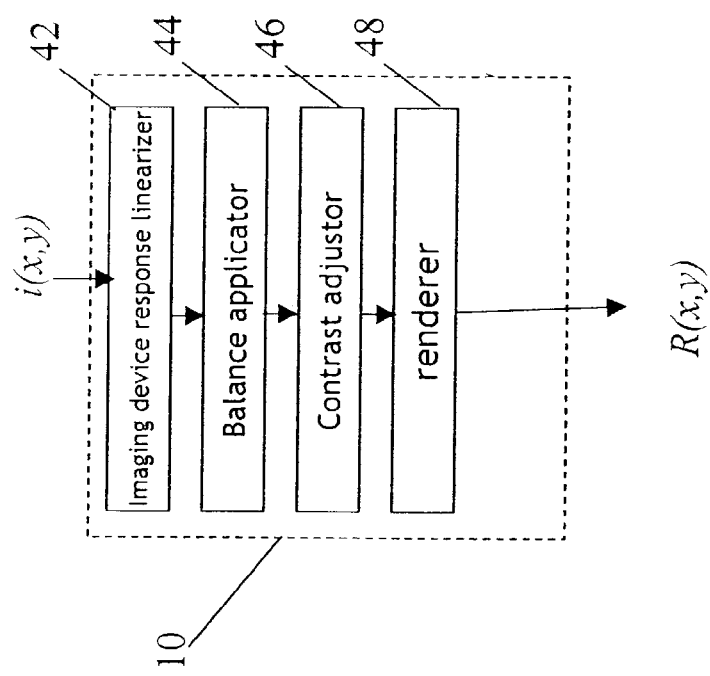
FIG. 5 is an exemplary image processing path.
Figure 6:
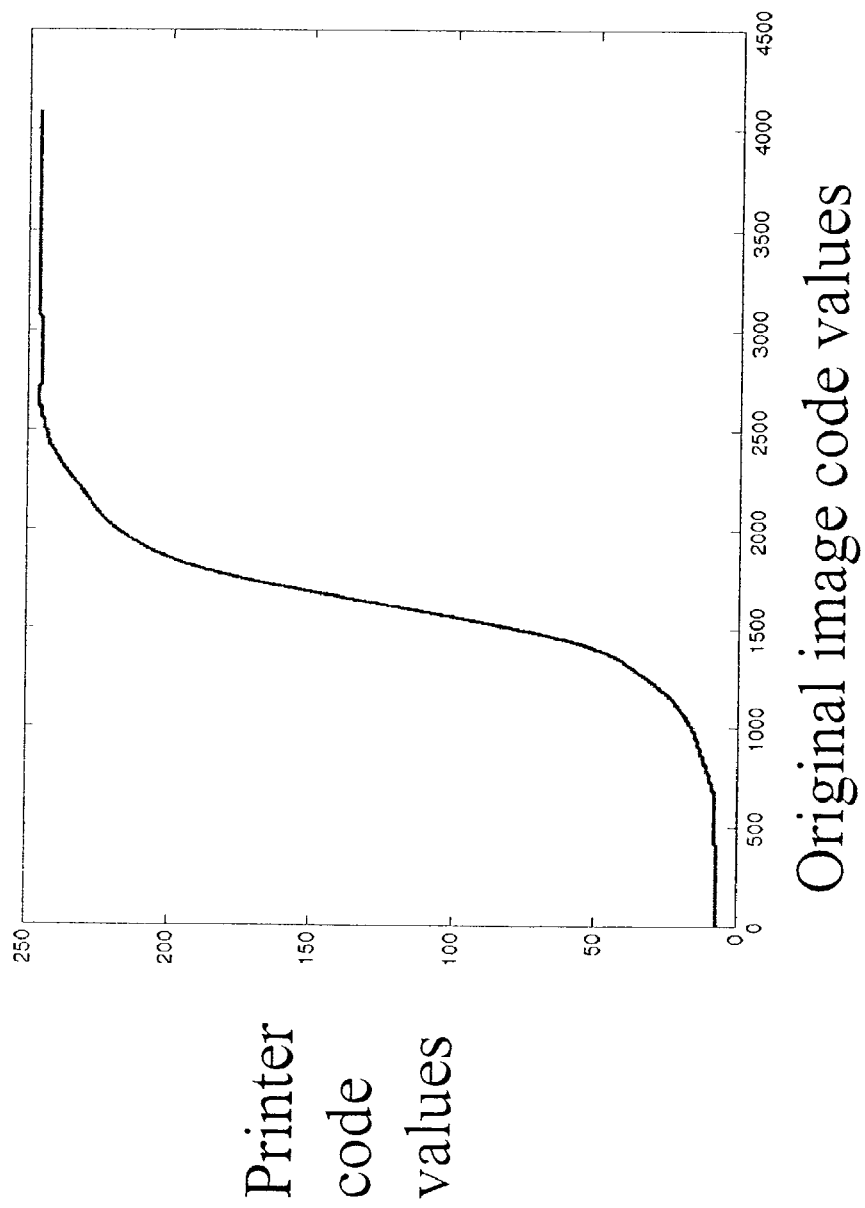
FIG. 6 is an example plot of a rendering LUT.

Referring to FIG. 4, an image processing path 10 includes one or more image transforms $20_{1-M}$. An image transform 20 is an operation that accepts an input image and possibly control parameters, and in a repeatable fashion, generates an output image. Referring to FIG. 5, an example image processing path 10 is shown. This exemplary image processing path 10 composed of image transforms $20_m$ designed to create a rendered image that is a photographic print from an input image that is a digital scan of a photographic negative. Examples of such image processing paths 10 are disclosed in U.S. Pat. Nos. 6,097,470 and 6,097,471, both issued Aug. 1, 2000, to Buhr et al. The image processing path 10 includes an imaging device response linearizer 42 that applies compensation for non-linearities in the response of the imaging device. A method of correcting for the non-linearities in the response of photographic film may be implemented if the digital image is of film origin. Such a method is described in U.S. Pat. No. 5,134,573 issued Jul. 28, 1992 to Goodwin. The image processing 10 path also includes a balance applicator 44 that applies a scene balance algorithm to the image. Image balancing is often performed by a scene balance algorithm (SBA) or automatic exposure determination algorithm (such as are used in high speed optical printers or in a Photo-CD scanner, see for example U.S. Pat. No. 4,945,406 issued Jul. 31, 1990 to Cok). Also, the image processing path includes a contrast adjuster 46 that determines and applies tonal modifications to the image. The contrast of the image may be estimated by an automatic algorithm. In addition, the contrast of the digital image may likewise be modified to a preferred level of contrast. An example of an algorithm that estimates image contrast and provides a means of adjusting the contrast of the image is described in U.S. Pat. No. 5,822,453 issued Oct. 13, 1998 to Lee et al. Finally, the image processing path 10 also includes a renderer 48 such as described in U.S. Pat. No. 6,097,470 issued Aug. 1, 2000 to Buhr et al. Rendering either a digital or optical image can with good accuracy be represented by a LUT (either one, three, or multi-dimensional.) For example, FIG. 6 shows the graph of a LUT that relates image pixel values to code values of an 8-bit printer, although those skilled in the art will recognize that many output image metrics may be used as the rendering space (for example, sRGB is common for viewing images on a computer monitor.)

Referring again to FIG. 3, the LUT generator 4 is identical to the previous description of the LUT generator 4. The gain determiner 8 receives the original image 2 i(x,y) and the gain LUT output from the LUT generator 4. The gain determiner 8 determines and outputs, for each pixel location (x,y) of the image, the appropriate gain factor β(x,y). This gain factor is found simply by performing a table look-up on the pixel values of the original image.

$$\beta(x,y) = \beta_{LUT}[i(x,y)], \quad (5)$$

The gain determiner 8 preferably performs a blurring operation (using either the lowpass filter b(x,y) or a different lowpass filter) on the original image before doing the table look-up.

The sharpener 12 then receives the rendered image R(x,y) and the gain factors β(x,y) from the gain determiner 8, and outputs a sharpened rendered image 18.

This embodiment enables the sharpening (of $D_{min}$ regions less than other regions to avoid unnecessary noise amplification) of a rendered image R(x,y) having pixel values whose relationship to the original film $D_{min}$ may not be straight forward by using the original image i(x,y) to determine appropriate gain factors β(x,y).

Figure 7:
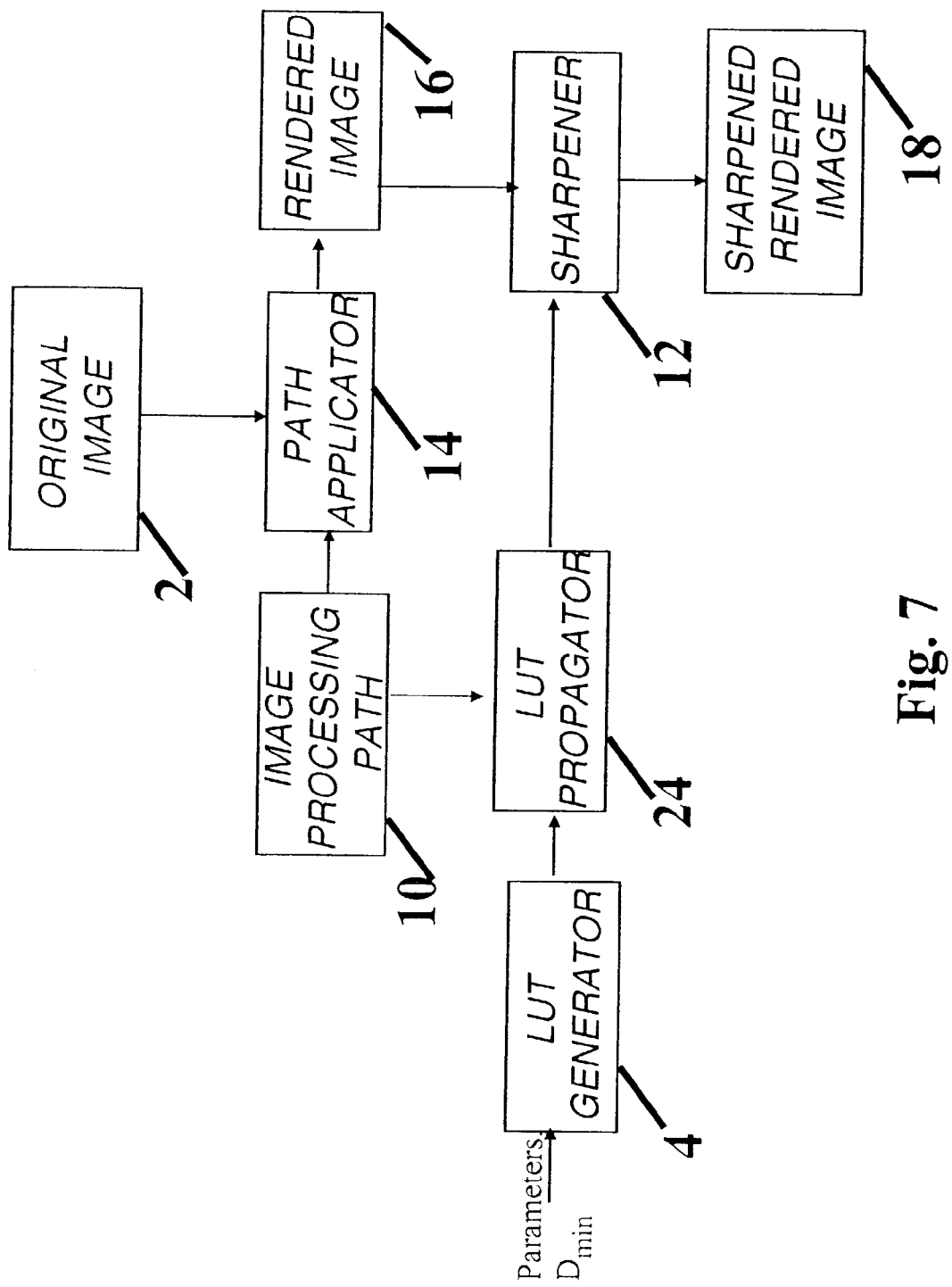
FIG. 7 is a block diagram illustrating a technique for sharpening a rendered image according to a third embodiment of the invention.

Therefore, the operation of the sharpener 12 of the second embodiment shown in FIG. 3 can be represented with the following equation:

$$s(x,y)=R(x,y)b(x,y)+\beta(x,y)f(R(x,y)-R(x,y)b(x,y)) \quad (6)$$

where:
s(x,y)=output image with enhanced sharpness without amplifying $D_{min}$ noise
R(x,y)=rendered digital image 16
b(x,y)=lowpass filter (described above)
β(x,y)=unsharp mask gain factor for location (x,y). Preferably in the second embodiment, the gain factor is found with β(x,y)=$\beta_{LUT}$[i(x,y)**b(x,y)],
where $\beta_{LUT}$[ ] is a look-up-table of gain factors and
i(x,y) is the original image 2.
f( )=fringe function
R(x,y)**b(x,y)=lowpass image (also called unsharp image)
R(x,y)−R(x,y)**b(x,y)=highpass image
** denotes two dimensional convolution
(x,y) denotes the $x^{th}$ row and the $y^{th}$ column of an image The previous embodiment has the advantage that a rendered image can still be sharpened such that the $D_{min}$ noise is not excessively amplified. However, the method requires that the original image and the rendered image must both exist at the same time. In some systems, this is inconvenient. FIG. 7 illustrates the third and preferred embodiment for applying sharpening to a rendered image in such a manner that the $D_{min}$ noise is not excessively amplified.

The LUT generator 4 is as previously described. The gain LUT $\beta_{LUT[\ ]}$ is then input, along with the image processing path 10, to the LUT propagator 24. The LUT propagator 24 propagates the gain LUT $\beta_{LUT}[\ ]$ through the image transforms $20_{1-M}$ of the image processing path 10 and outputs a rendered gain LUT $\beta_{R\_LUT[\ ]}$ for producing rendered gain factors corresponding to the pixel code values of the rendered digital image 16 R(x,y).

Figure 8B:
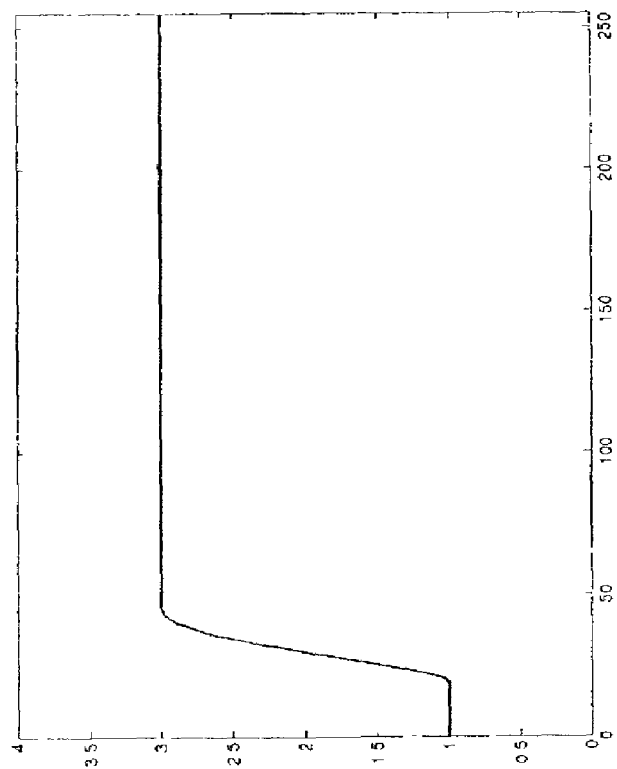
FIGS. 8A and B are plots of rendered gain LUTs $\beta_{R\_LUT}[x]$, made by propagating the gain LUT through two different image processing paths.
Figure 8A:
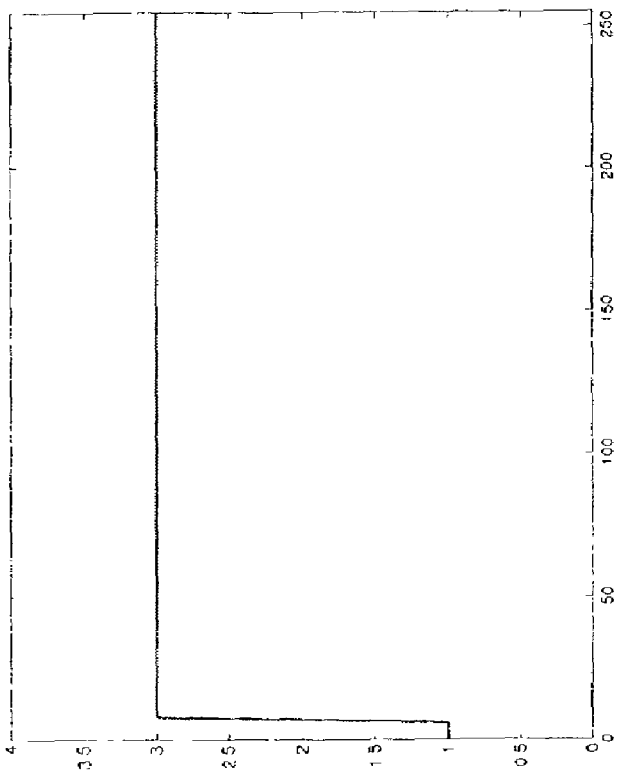

Rendered gain LUTs, $\beta_{R\_LUT[\ ]}$, originating from a common gain LUT $\beta_{LUT[\ ]}$, can appear quite different depending on the image transforms $20_{1-M}$ of the image processing path 10. For example, consider an image processing path consisting of two image transforms 20, a balance operation followed by a rendering tone scale operation that was already shown in FIG. 5. A balance shift (additive offset for each pixel value of the digital image) for an underexposed original image is, for example, 800. A balance shift for a normally exposed original image is, for example, 0. FIGS. 8a and 8b show the resulting rendered gain LUTs for the underexposed image and the normally exposed image. The results are as expected: the rendered image created from the underexposed image will be sharpened less in the lower code values. However, the rendered image created from the normally exposed image can be sharpened more over a wider range of code values, since the $D_{min}$ region from the original image will be very dark (i.e. low code value) in the rendered image.

Referring back to FIG. 7, the LUT propagator 24 operates by propagating the gain LUT $\beta_{LUT[\ ]}$ through each image transform of the image processing path 10 that is used to generate the rendered digital image from the original digital image. Propagation through a balance shift or LUT image transform occurs as follows:

$$\beta_{P\_LUT}[w] = \beta_{LUT}[v] \qquad (7)$$

Where $\beta_{P\_LUT}[x]$ is a gain LUT, propagated through image transform T w=T(v)

v is an input value to the image transform T, w is the output value from the image transform T.

Propagation of the gain LUT continues in a manner shown above, propagating the gain LUT through one transform at a time to create the rendered gain LUT $\beta_{R\_LUT[\ ]}$ from the original gain LUT, according to the image transforms of the image processing path. Note that it is possible to combine several image transforms into a single image transform before propagating. In addition, when the gain LUT has been propagated through the final image transform of the image processing chain, then the rendered gain LUT $\beta_{R\_LUT[\ ]}$ is equivalent to the last propagated gain LUT $\beta_{P\_LUT[\ ]}$.

In a preferred embodiment, certain image transforms 20 have little or no impact on the propagated $D_{min}$ value, and thus may be skipped or omitted when calculating the propagated $D_{min}$ value. For instance, spatial operations such as red eye correction generally do not modify the value of $D_{min}$ and may be omitted. Other, more complicated image transforms 20, such as object recognition do not affect the propagated value of $D_{min}$ and may also be ignored. These ignored image transforms are not relevant to the propagated $D_{min}$ value.

Those skilled in the art will recognize that the LUT propagator 24 could also operate by propagating only certain control parameters through the image processing path, and then the rendered gain LUT could be constructed using a mathematical formula similar to Equation (1). For example, $X_{min}$ and $X_{max}$ could be propagated through the image processing path simply by applying each image transform of the image processing path to the values of $X_{min}$ and $X_{max}$ as if they were the values of two pixels of an image undergoing modification by the image processing path. The result of this process would be a rendered version of $X_{min}$ and $X_{max}$, $X_{minR}$ and $X_{maxR}$, respectively. The LUT propagator 24 would then construct the rendered gain control LUT $\beta_{R\_LUT[\ ]}$ simply by evaluating Equation (1), substituting $X_{minR}$ for $X_{min}$ and substituting $X_{maxR}$ for $X_{max}$.

Referring again to FIG. 7, the original image 2 i(x,y) is input to a path applicator 14, along with an image processing path 10. The path applicator 14 modifies the original image 2 i(x,y) using the image processing path 14, in order to create a rendered image 16 R(x,y), as was disclosed above.

The sharpener 12 then inputs the rendered image 16 R(x,y) and the rendered gain LUT $\beta_{R\_LUT[\ ]}$ from the LUT propagator 24 and produces a sharpened rendered image 18. This embodiment enables the sharpening (of $D_{min}$ regions less than other regions to avoid unnecessary noise amplification) of a rendered image having pixel values whose relationship to the original film $D_{min}$ may not be straight forward.

The operation of the sharpener 6 in the third embodiment can be represented with the following equation:

$$s(x,y)=R(x,y)b(x,y)+\beta(x,y)f(R(x,y)-R(x,y)b(x,y)) \qquad (8)$$

where:

s(x,y)=output image with enhanced sharpness without amplifying $D_{min}$ noise

R(x,y)=rendered digital image b(x,y)=lowpass filter (described above)

$\beta(x,y)$=unsharp mask gain factor for location (x,y). Preferably in the second embodiment, the gain factor is found with $$\beta(x,y)=\beta_{R\_LUT}[R(x,y)**b(x,y)],$$

f( )=fringe function

R(x,y)**b(x,y)=lowpass image (also called unsharp image)

R(x,y)-R(x,y)**b(x,y)=highpass image

** denotes two dimensional convolution (x,y) denotes the $x^{th}$ row and the $y^{th}$ column of an image Those skilled in the art will recognize that there are several methods by which unsharp masking (such as provided by Eq. (2)) can be applied to a color image having multiple channels. For example, the unsharp mask process can be applied to each channel of the color image. Preferably, the unsharp mask process is applied in the following manner, commonly known in the art.

Assuming the input image is a color image consisting of red, green, and blue color channels, a matrix is first applied to the image in order to produce a luminance channel and two or more color difference channels. Next the unsharp mask process is applied to the luminance channel. Finally, an inverse matrix is applied to the luminance and color difference channels to generate an enhanced color image having red, green, and blue channels.

Alternatively, the unsharp mask process may be applied to only a single image channel (e.g. the green channel), and the modified highpass data may be summed with each color channel in order to generate an enhanced color image. These and other similar modifications and enhancements to the unsharp mask process would be well understood by those of skill in this art. Since the particularities of their usage are not fundamentally related to the method of selecting sharpening parameters for the variable gain sharpening, their particular application does not act in any way to limit the scope of the invention.

Those skilled in the art will also recognize that although Eq. (2) and the present invention generally describe the sharpening applied to the image as being performed by an unsharp mask, that is not necessarily the case. Assuming the fringe function f( ) of Eq. (2) is identity, the unsharp mask process can be reconfigured as a single filter than can be applied with convolution to the image and produce results identical to the unsharp mask. For example, suppose the filter coefficients of b(x,y) are given as:

$$b(x, y) = \frac{\begin{bmatrix} 1 & 2 & 1 \\ 2 & 4 & 2 \\ 1 & 2 & 1 \end{bmatrix}}{16}. \quad (9)$$

Application of a filter c(x,y) with a convolution having coefficients given as $$c(x, y) = \frac{\begin{bmatrix} 1-\beta & 2(1-\beta) & 1-\beta \\ 2(1-\beta) & 4(1+3\beta) & 2(1-\beta) \\ 1-\beta & 2(1-\beta) & 1-\beta \end{bmatrix}}{16} \quad (10)$$

will produce identical results compared with using filter b(x,y) in the unsharp mask of Equation (2). Such modifications to the preferred embodiment by the grouping of operations in the image sharpener 6 such as can be determined by methods well known in algebra and digital signal processing will be evident to those of skill in this art and are within the scope of the present invention.

The present invention has been described with reference to a preferred embodiment. Changes may be made to the preferred embodiment without deviating from the scope of the present invention. For example, a similar approach can be applied to digital image capture systems, such as digital cameras, where the lowest possible pixel values that can be produced by the image capture system are referred to a $D_{min}$.

PARTS LIST 2 original image i(x,y)
4 LUT generator
6 sharpener
8 gain determiner
10 image processing path
12 sharpener
14 path applicator
16 rendered image R(x,y)
18 sharpened rendered image
20$_{1-M}$ image transforms
22 sharpened image
24 LUT propagator
42 imaging device response linearizer
44 balance applicator
46 contrast adjustor
48 renderer

What is claimed is:

1. A method of sharpening a digital image having image pixels values, comprising the steps of:
   determining a plurality of $D_{min}$ values, each said $D_{min}$ value representing a respective pixel value of a reference dark scene image corresponding to a minimum possible exposure for a system that produced the digital image;
   averaging said determined $D_{min}$ values to remove fluctuations due to noise in the pixel values of the reference dark scene image and provide an average $D_{min}$ value;
   for each pixel value in the digital image providing a gain factor that is dependent on the difference between the pixel value and the average $D_{min}$ value, such that pixel values nearer the average $D_{min}$ value have smaller gain factors, said gain factors are provided by a lookup table that models a monotonic function of pixel value, said monotonic function increasing from the average $D_{min}$ value to a predetermined pixel value and being constant for pixel values that exceed the predetermined pixel value;
   applying an image processing path including one or more image transforms to the original digital image resulting in a rendered digital image;
   applying the image processing path to the gain factors to form rendered gain factors; and
   using the rendered gain factors to sharpen the rendered digital image.

2. A computer program product stored on computer readable medium for sharpening a digital image having image pixels values, comprising the steps of:
   determining a plurality of $D_{min}$ values, each said $D_{min}$ value representing a respective pixel value of a reference dark scene image corresponding to a minimum possible exposure for a system that produced the digital image;
   averaging said determined $D_{min}$ values to remove fluctuations due to noise in the pixel values of the reference dark scene image and provide an average $D_{min}$ value;
   for each pixel value in the digital image providing a gain factor that is dependent on the difference between the pixel value and the average $D_{min}$ value, such that pixel values nearer the average $D_{min}$ value have smaller gain factors, said gain factors are provided by a lookup table that models a monotonic function of pixel value, said monotonic function increasing from the average $D_{min}$ value to a predetermined pixel value and being constant for pixel values that exceed the predetermined pixel value;
   applying an image processing path including one or more image transforms to the original digital image resulting in a rendered digital image;
   applying the image processing path to the gain factors to form rendered gain factors; and
   using the rendered gain factors to sharpen the rendered digital image.

3. A system of sharpening a digital image having image pixels values, comprising:
   means for determining a plurality of $D_{min}$ values, each said $D_{min}$ value representing a respective pixel value of a reference dark scene image corresponding to a minimum possible exposure for a system that produced the digital image;
   means for averaging said determined $D_{min}$ values to remove fluctuations due to noise in the pixel values of the reference dark scene image and provide an average $D_{min}$;

means for providing a gain factor for each pixel value in the digital image, said gain factor each being dependent on the difference between the pixel value and the average $D_{min}$, value, such that pixel values nearer the average $D_{min}$ value have smaller gain factors, said gain factors are provided by a lookup table that models a monotonic function of pixel value, said monotonic function increasing from the average $D_{min}$ value to a predetermined pixel value and being constant for pixel values that exceed the predetermined pixel value;

means for applying an image processing path including one or more image transforms to the original digital image resulting in a rendered digital image;

means for applying the image processing path to the gain factors to form rendered gain factors; and means for using the rendered gain factors to sharpen the rendered digital image.

* * * * *

UNITED STATES PATENT AND TRADEMARK OFFICE
CERTIFICATE OF CORRECTION

PATENT NO. : 7,228,004 B2 Page 1 of 1
APPLICATION NO. : 10/235130
DATED : June 5, 2007
INVENTOR(S) : Andrew C. Gallagher et al.

It is certified that error appears in the above-identified patent and that said Letters Patent is hereby corrected as shown below:

| Issued Patent | | Description of Error |
| --- | --- | --- |
| Column | Line | |
| 13 | 4 | In Claim 3, delete "$D_{min,}$" and insert -- $D_{min}$ --, therefor. |

Signed and Sealed this

Sixteenth Day of March, 2010

David J. Kappos
*Director of the United States Patent and Trademark Office*